April 10, 1951
W. T. DUNN
2,548,207
TORQUE CONVERTER
Filed July 10, 1948
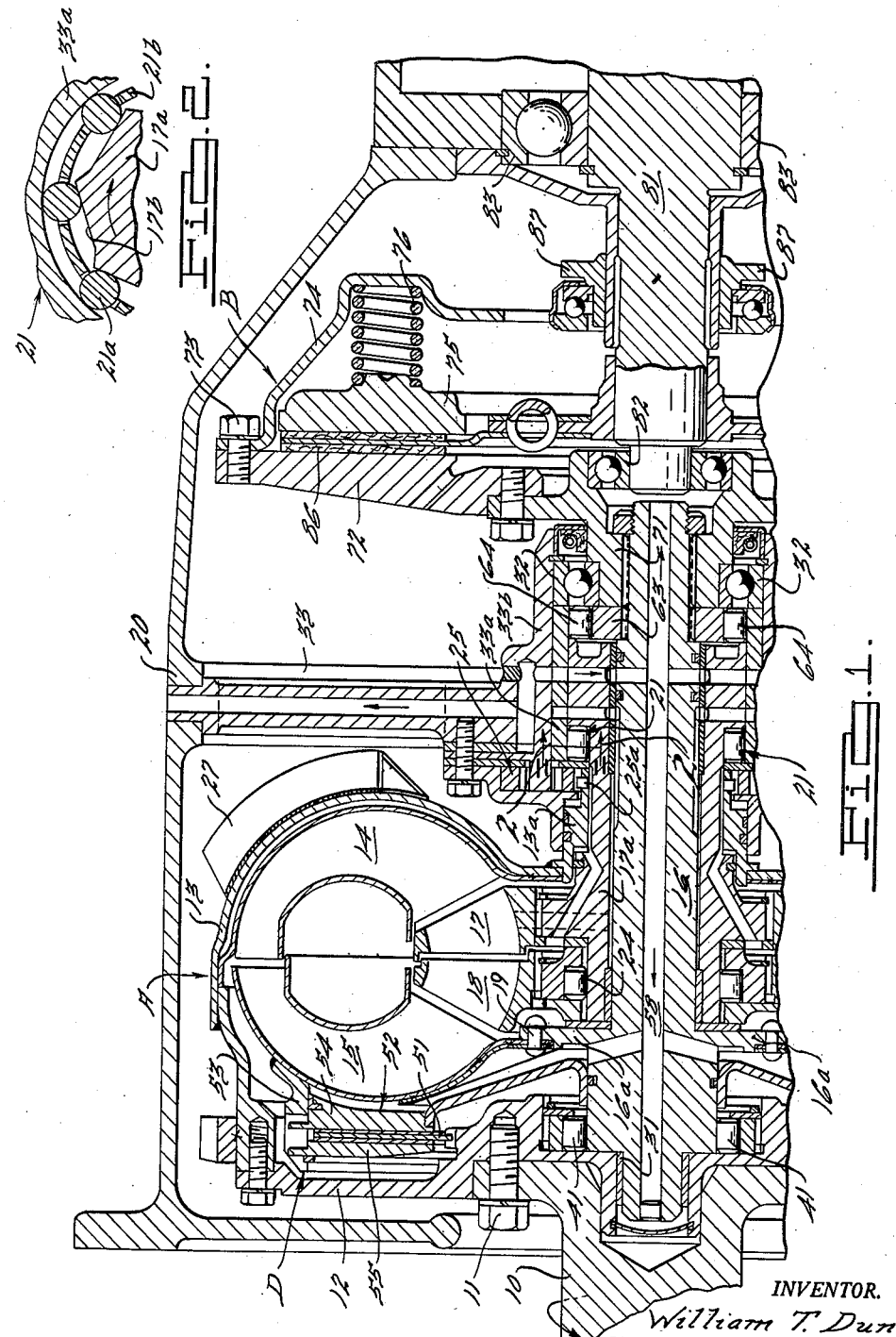
INVENTOR.
William T. Dunn.
BY
Harness and Harris
ATTORNEYS.

Patented Apr. 10, 1951

2,548,207

UNITED STATES PATENT OFFICE 2,548,207

TORQUE CONVERTER

William T. Dunn, Detroit, Mich., assignor to Chrysler Corporation, Highland Park, Mich., a corporation of Delaware Application July 10, 1948, Serial No. 38,135

15 Claims. (Cl. 192—3.2)

1

This invention relates to the association of a braking device with a power transmitting device having a slip characteristic whereby undesired movement of certain of the drive transmitting elements is prevented.

More particularly this invention relates to an improved and simplified braking device for a fluid power transmitting unit which braking device will function as a hill holder and a parking brake if the power transmitting unit is incorporated in a conventional motor vehicle drive train.

It is another object of this invention to improve and simplify the design of a power transmitting device comprising a slip-drive unit drivingly connected to a friction clutch unit, the power transmitting device including a one-way brake device between the aforementioned drive transmitting units. This brake device is arranged so as to prevent undesired relative movement between certain of the drive transmitting elements of the several units which movement might otherwise occur due to the slip characteristic of the slip drive unit.

It is a further object of this invention to associate a one-way brake device with a drive transmitting device comprising a slip-drive unit and a clutch unit whereby the condition of the clutch determines the operability of the brake device.

A still further object of this invention is to associate a one-way brake device with a drive transmitting device including a fluid power transmitting unit whereby drive in a direction opposite to the selected direction of drive is prevented. It is obvious that such drive might otherwise occur due to the slip inherent in a fluid power transmitting device.

An additional object of this invention is to associate a pair of one-way brake devices with a fluid power transmitting unit whereby desired drive in one direction from the normally driven element may be transmitted to the normally driving element but undesired drive between such elements is prevented.

It is another object of this invention to provide a slip-drive power transmitting device with a pair of one-way brake devices to insure the transmission of drive between the driving and driven members in one direction but prevent the transmission of drive between said members in the opposite direction.

It is a still further object of this invention to provide a slip-drive power transmitting device with a brake device so constructed and arranged that it prevents the transmission of undesired drive through said power transmitting device yet does not prevent the use of standard drive

2 transmitting units nor increase the cost of manufacture or assembly of the several drive transmitting units.

It is a further object of this invention to provide an improved torque converter drive transmitting device including an improved and simplified lock-up clutch mechanism for the converter impeller and turbine members.

Other objects and advantages of this invention will be apparent from a consideration of the attached specification and related drawings wherein:

Fig. 1 is a partial sectional elevational view of my fluid power transmitting device which includes a torque converter unit connected in series with a friction clutch device; and Fig. 2 is a fragmentary sectional elevational view taken along the line 2—2 of Fig. 1 disclosing the type of one-way brake or free-wheeling means used to accomplish the objects of this invention.

Fig. 1 of the drawing discloses a fluid power transmitting device including a hydraulic torque converter unit A. Converter unit A is drivingly connected to a friction clutch unit B and both units are mounted within a housing 20. The reference numeral 10 represents an end portion of an input or a driving member, such as the engine crankshaft of a motor vehicle power unit. The shaft 10 is fixedly connected to a flywheel assembly 12 by the screw means 11. The flywheel assembly 12 carries the torque converter casing 13 within which are mounted the converter components, namely, the impeller member 14, the turbine or runner member 15, and the primary and secondary guide wheel members or reaction wheels 17 and 18 respectively. The vaned impeller wheel 14 is fixedly connected to the converter casing 13 and is accordingly adapted to be rotatably driven by the driving shaft 10. The vaned turbine wheel 15 is drivingly connected by rivet means 19 to a radially extending flange portion 16a formed on the forward end portion of the intermediate driven shaft member 16.

The driven shaft member 16 is adapted to transmit drive between the torque converter unit A and the friction clutch unit B. The forward end portion of shaft 16 is piloted in the hub of the flywheel assembly 12. A sleeve type bearing 31 rotatably supports the forward end of shaft 16 in the flywheel hub. The rear end portion of shaft 16 is rotatably supported by a bearing assembly 32 mounted in an axially extending sleeve portion 33b projecting from the housing wall 33.

The vaned primary guide wheel 17 is rotatably supported on driven shaft 16 by means of the guide wheel hub portion 17a. Hub portion 17a is adapted to be connected to the housing 20 through an overrunning or one-way brake device 21 associated with a sleeve portion 33a carried by the housing wall 33. As clearly shown in Fig. 2, the one-way brake device 21 comprises rollers 21a mounted within a cage member 21b. The cage member 21b is normally urged into drive transmitting position by means of a tension spring (not shown). Cam surfaces 17b, formed on the peripheral surface of the guide wheel hub portion 17a, cooperate with the clutch rollers 21a and the interior surface of the housing sleeve portion 33a to permit only forward or clockwise rotation of the guide wheel 17 when looking in the direction of arrows 2—2 of Fig. 1. The sleeve portion 33a which constitutes an outer race for the rollers 21a of the one-way brake device 21, is fixedly connected to the transmission housing wall 33 in any approved manner. It is obvious that the one-way brake 21 permits forward rotation to be transmitted to guide wheel 17 by forward rotation of the impeller 14 but prevents rotation of the guide wheel 17 in a reverse or counterclockwise direction.

The secondary guide wheel 18 is rotatably mounted on the forward end of the primary guide wheel hub portion 17a by means of the overrunning or one-way brake device 24. The one-way brake device 24 is similar in design to the brake device 21, shown in Fig. 2. The brake device 24 is designed so as to prevent rotation of guide wheel 18 in a counterclockwise direction when looking from the forward or driving end of the power transmitting unit in the direction of arrows 2—2 of Fig. 1. It will be noted that guide wheel 18 is connected to the transmission housing wall 33 through the brake device 24, the hub portion 17a of the guide wheel 17, and the brake device 21. This particular arrangement permits relative rotation between the guide wheels 17 and 18 in a forward direction but prevents reverse or counterclockwise rotation of either or both of the guide wheels 17 and 18.

Heretofore it has been common practice to connect the several guide wheels of a torque converter unit to a sleeve-like, axially extending, stationary, projection carried by the converter housing. Usually this stationary housing sleeve member is positioned in the same location as the hub portion 17a of this design. The several guide wheels are usually connected to the forward end portion of this fixed sleeve member through freewheeling or one-way brake devices. Such an arrangement provides the necessary reaction means for the converter unit but it tends to materially increase the wear of the converter elements due to the fact that the converter casing flange 13a is frequently rotating at one speed, the supporting sleeve for the guide wheels, located in a position similar to the hub 17a, is stationary and the turbine driven shaft 16, within the stationary casing sleeve, is rotated at still a different speed. The difference in rotative speeds of the three concentrically arranged converter members, corresponding to the members 13a, 17a and 16, materially increases the wear of these members. By the construction herein disclosed the speed differential between these members is reduced and this accordingly reduces the wear of these elements. Furthermore, the particular guide wheel arrangement herein disclosed is much easier to manufacture and assemble than one having a stationary, axially projecting, reaction sleeve supporting the several guide wheels. As a result of the particular arrangement herein disclosed, the guide wheels 17 and 18, connected to the transmission housing wall 33 through the one-way brake devices 21 and 24 and the rotatable hub 17a, provide the reaction means for the torque converter unit yet reduce the cost and increase the life of the converter unit. By using a plurality of guide wheels, connected to the transmission housing through separate one-way clutches, the efficiency and operating characteristics of the converter unit are materially improved. The subject matter herein disclosed relating to the mounting of the guide wheels is covered by application, Serial No. 42,725 of Augustin J. Syrovy, filed August 5, 1948.

An overrunning or one-way clutch device 41 is mounted between the forward end portion of shaft 16 and the encircling hub portion of the flywheel assembly 12. This one-way clutch device 41 is designed so as to prevent the speed of the driving shaft 10 from dropping below the speed of the driven shaft 16. Such an arrangement is quite advantageous due to the fact that it provides a means for obtaining engine braking in an engine driven power transmitting device having a slip characteristic. Without some positive lock-up means between the driven shaft 16 and the driving shaft 10, on coast drive, slip would occur in the torque converter unit that would tend to nullify the braking effect of the power unit drivingly connected to the shaft 10. The clutch device 41 has particular importance in motor vehicle drive for not only does it provide a means for obtaining engine braking on coast drive, but it also provides a means that automatically locks the driven shaft 16 to the driving shaft 10 to facilitate starting of the engine connected to shaft 10 by towing or the like. The free-wheeling or one-way clutch device 41 is similar in design to the one-way brake device 21 shown in Fig. 2 but for the fact that the cams on the shaft 16 that cooperate with the rollers of the one-way device 41 are slanted in a direction opposite to that of the cam surfaces 17b. Such an arrangement insures lock-up of the clutch device 41 when the driven shaft 16 drives the driving shaft 10 in a forward or clockwise direction (looking in the direction of arrows 2—2 of Fig. 1).

The torque converter unit A includes a gear type oil pump 25 having a driving gear which is directly connected by pin means 25a to the axially extending flange portion 13a of the rotatable converter casing 13. The pump 25 draws oil from a sump (not shown) and circulates it through the converter unit and the other associated hydraulically operated mechanisms. This pump 25 provides pressure fluid for lubricating purposes as well as for actuation of the various hydraulically operated control mechanisms (not shown) associated with the transmission. The circulation of oil through the converter, by the pump 25, provides a means for maintaining the converter full of oil whenever shaft 10 is rotating. Furthermore, this circulation of the working fluid through the converter and the lubricating and control systems provides a means for cooling the converter fluid. To further assist in the cooling of the converter fluid, fins 27 are provided on the exterior surface of the converter casing 13 to circulate air about the converter casing which fan action tends to reduce the temperature of the fluid within the converter casing.

In order to provide means for transmitting a positive direct drive from the driving shaft 10 to the driven shaft 16 a torque converter lock-up clutch D is provided. The lock-up clutch D includes the radially extending, friction surfaced disc member 51, which member is drivingly mounted on the flywheel assembly 12. Cooperatively associated with the disc 51 is the hydraulically operated clutch actuating means 52, mounted on the turbine member 15 of the converter unit. The clutch actuating means 52 includes a cylinder 53 within which a piston member 54 is reciprocatably mounted. Cylinder 53 also supports a backing plate 55 adapted to cooperate with piston 54 to clampingly engage the disc member 51 when piston 54 is moved forwardly as a result of the admission of pressure fluid to cylinder 53. Pressure fluid is supplied to cylinder 53 by pump 25 through the bore 58 in shaft 16. Spring means (not shown) normally urge the piston 54 rearwardly to a disengaged position. It will be noted that when the clutch piston 54 has engaged the disc member 51 with the backing plate 55 then the torque converter impeller member 14 and the turbine member 15 are locked together and a positive direct drive is transmitted from the driving shaft 10 to the driven shaft 16. The particular lock-up clutch construction herein disclosed is particularly advantageous for motor vehicle drive due to the fact that substantially the entire lock-up clutch mechanism is carried by the torque converter turbine member 15 which arrangement tends to reduce the inertia and increase the flexibility of the power unit driving the input shaft 10 and impeller 14. The lockup clutch 52 is usually engaged after the torque multiplying effect of the converter has dropped to a low ratio but before the converter unit begins to function as a fluid coupling. By such an arrangement the torque multiplying effects of the converter unit is most advantageously used.

Splined to the rear portion of shaft 16 is a collar 63. Mounted between collar 63 and the portion 33a of housing wall 33 is a one-way brake device 64 which device is similar in design to the brake device shown in Fig. 2. Brake device 64 is adapted to prevent reverse or counterclockwise rotation of the shaft member 16 (when looking in the direction of the arrows 2—2 of Fig. 1). The particular arrangement of the brake 64 and its function in this power transmitting unit will be subsequently discussed in detail.

Also splined to the rear portion of shaft 16 is the hub portion 71 of the clutch backing plate 72. Plate 72 forms a portion of the driving side of the friction clutch B. Connected to the backing plate 72 by screws 73 is the clutch cover plate 74. Mounted between cover plate 74 and backing plate 72 is a pressure plate 75 which is normally urged towards backing plate 72 by the compression spring means 76.

A final driven or output shaft 81, which can be the input shaft of a variable speed motor vehicle transmission, has its forward end portion rotatably supported in the bearing assembly 82 mounted in the hub portion 71 of the friction clutch backing plate 72. Shaft 81 is also rotatably supported by the bearing assembly 83 carried by the housing 20. Fixedly connected to the forward portion of shaft 81 is the radially extending friction surfaced, clutch disc 86. Clutch disc 86, which normally constitutes the driven side of clutch B, is positioned between the backing plate 72 and the pressure plate 75 so that it is normally clamped in drive transmitting engagement with the plates 72 and 75 due to the pressure exerted by the springs 76. When the clutch B is to be disengaged suitable means (not shown) are actuated through axial movement of the sleeve member 87 and the pressure plate 75 is retracted rearwardly against the pressure exerted by the springs 76. Retraction of pressure plate 75 breaks the drive train from shaft 16 to shaft 81 and permits shaft 81 to rotate relative to the shaft 16.

The operation of the power transmitting device shown in Fig. 1 is as follows. Assume that an engine or some similar driving unit connected to shaft 10 tends to rotate the shaft 10 in a clockwise direction, as viewed from the forward end of the device looking in the direction of the arrows 2—2 of Fig. 1. Shaft 10 will rotate the converter casing 13 in a clockwise direction and this will drive the impeller member 14 in the same direction. The shaping of the vanes of the impeller, turbine and guide wheels of the converter unit is such that clockwise rotation of impeller 14 directs the converter fluid against the vanes of the turbine member 15 in a manner which tends to rotate the turbine 15 in a clockwise direction. On initiating drive through this torque converter unit the converter fluid passing from the impeller member across the turbine member is directed against the guide wheel vanes in such a manner that there is a tendency to rotate the guide wheels in a reverse or counterclockwise direction. As the one-way brake devices 21 and 24 prevent reverse rotation of the guide wheels 17 and 18, the guide wheels are locked-up in a substantially stationary condition and as a result the converter fluid is redirected from the guide wheels back into the turbine member to assist in the drive of the turbine member. The reaction effect produced by the locked-up guide wheels during starting drive through the converter unit produces the torque multiplication inherent in a converter unit. As the speed of the turbine member 15 increases and the torque demand on shaft 16 begins to decrease, the speeds of the converter impeller member 14 and the turbine member 15 tend to attain substantially the same value. As the speeds of these members begin to approach the same value, the reaction forces directed against the guide wheel vanes gradually disappear and the impelled fluid within the converter begins to drive the guide wheels forwardly in a clockwise direction. The forward drive of the guide wheels is a step-by-step process as first the secondary guide wheel 18 is picked up by the converter fluid and rotated forwardly and thereafter the primary guide wheel is driven forwardly. The use of a plurality of converter guide wheels improves the efficiency and operating characteristics of the converter unit.

If the speed of shaft 10 is increased and drive is continued through the torque converter unit, eventually the impeller, turbine and guide wheels will all be rotating in the same direction at substantially the same speed and the converter unit will begin to function as a simple fluid coupling. However, due to the fact that the torque multiplying effect of the converter unit decreases rapidly with increase in speed of the driven turbine member 15 and also due to the fact that the advantages of the converter unit are less noticeable as the speed of the turbine member increases, suitable control means (not shown), automatically effect engagement of the torque converter lock-up clutch D, after the torque multiplying effect of the converter unit has been most advantageously utilized, but prior to the time the converter unit begins to function as a simple fluid coupling, so that thereafter a positive direct drive is transmitted directly from the input or driving shaft 10, via clutch D, to driven shaft 16.

Let us now consider the desired function and purpose of the one-way brake 64 of this drive transmitting device as applied to a motor vehicle drive train. If a vehicle embodying a slip-drive power transmitting device is parked on an incline such as would tend to cause the vehicle to roll backwards, and if it is impossible or undesirable to use a special brake to prevent such backwards movement, then the driving engine alone cannot be relied upon to prevent the backwards movement of the vehicle, for the turbine 15 of the fluid drive unit A might slip and rotate in a counterclockwise direction with respect to the impeller 14. The one-way brake 64 will prevent such slip and consequent backwards movement of the vehicle in the following manner. Backwards movement of the vehicle would cause the transmission input shaft 81 to rotate in a counterclockwise direction (looking in the direction of the arrows 2—2 of Fig. 1). This would result in an attempted counterclockwise movement of the clutch disc 86 which drive would be transmitted through the clutch B, if engaged, to the shaft 16. As was previously explained counterclockwise movement of the shaft 16 cannot take place, because any attempted counterclockwise movement of shaft 16 causes the cammed peripheral surface of collar 63 to lock-up the one-way brake 64 against the encircling interior wall surface of housing sleeve 33a. Thus counterclockwise movement of shaft 81 cannot take place when clutch B is engaged. If it is desired to permit the aforementioned backwards movement of the vehicle, the clutch B may be disengaged, to thereby free the input shaft 81 from the clutch B and the one-way brake 64.

It may be desirable to prevent backwards movement of a vehicle incorporating this drive transmitting device at other times than when the vehicle is parked. For example, the vehicle may be temporarily stopped in traffic on a rearwardly inclined hill or the like under conditions that would make it impossible or dangerous to speed up the engine sufficiently to cause the impeller 14 of the fluid drive unit A to rotate fast enough in a clockwise direction to prevent counterclockwise movement of the turbine 15 resulting from backwards drift of the vehicle. It is only required that the clutch B be engaged and then the one-way brake 64 will lock-up on any backwards movement of the vehicle and anchor the shaft 16 against counterclockwise rotation. This arrangement provides a hill holder device that eliminates racing of the engine and facilitates smooth effortless driving under all conditions.

If the vehicle should happen to be on an incline such as would cause it to move forward, undesired movement in this direction may be prevented by conditioning the associated transmission for reverse drive. Forward movement of the vehicle, with the transmission set for reverse drive, would result in counterclockwise rotation of the transmission input shaft 81. The counterclockwise rotation of shaft 81 would be transmitted through the engaged clutch B to the shaft 16. However, counterclockwise rotation of shaft 16 can not occur for such movement causes the one-way brake 64 to lock the shaft 16 to the housing portion 33a and thus prevents counterclockwise rotation of shaft 16. Disengagement of clutch B will permit forward movement of the vehicle if such movement is desired at any time.

The construction herein disclosed not only provides an efficient hill holder and parking brake 64 but it also provides a one-way clutch 41 whereby the normally driven member 16 of a slip-drive unit may positively drive the normally driving member 10 of the unit. Furthermore, the construction herein disclosed is particularly simple and economical to manufacture and install. The torque converter unit A and the clutch unit B are standard production units which need not be materially modified to cooperate with the several one-way brake devices that accomplish the desired functions herein set forth.

I claim:

1. The combination with a driving shaft, a fluid power-transmitting device and a clutch device including engageable driving and driven sides, means drivingly connecting the driving shaft to the fluid power-transmitting device and means drivingly connected between the fluid power-transmitting device and the driving side of the clutch device, of a one-way brake associated with the last mentioned means adapted to prevent rotation of the driving side of said clutch device in a direction opposite to the normal direction of rotation of said driving shaft.

2. The combination with an engine-driven shaft, a fluid power-transmitting device and a clutch device, means drivingly connecting the engine-driven shaft and the fluid power-transmitting device, and means drivingly connecting the fluid power-transmitting device and the clutch device, of a one-way brake associated with the last mentioned means and positioned between said power transmitting device and said clutch device adapted to prevent drive of said clutch device in a direction opposite to that of said engine-driven shaft.

3. The combination with an engine-driven shaft, a slip-drive power transmitting device, a clutch having a driving side and a driven side, means for drivingly connecting the engine driven shaft with the power transmitting device, and means for drivingly connecting the power transmitting device with the driving side of the clutch; of a one-way brake associated with the driving side of the clutch adapted to prevent drive of the driving side of the clutch in a direction opposite to the normal direction of drive of the engine driven shaft.

4. The combination with an engine-driven shaft, and a transmission input shaft, of a slip-drive power transmitting device and a clutch device arranged in series and positioned between said shafts, said clutch device and said slip-drive power transmitting device each having a driving side and a driven side, means for drivingly connecting the engine-driven shaft with the driving side of the slip-drive power transmitting device, means for drivingly connecting the driven side of the slip-drive power transmitting device with the driving side of the clutch device, and means for drivingly connecting the driven side of the clutch device with the input shaft, and a one-way brake associated with the means drivingly connecting the driven side of the slip-drive power transmitting device and the driving side of the clutch device adapted to prevent drive of the driving side of said clutch device in a direction opposite to the normal direction of rotation of the engine-driven shaft.

5. The combination with an engine-driven shaft, and a transmission input shaft, of a slip-drive power transmitting device and a clutch device positioned between said shafts, said power transmitting device and said clutch device each having a driving side and a driven side, means for drivingly connecting the engine-driven shaft with the driving side of the power transmitting device, means for drivingly connecting the driven side of the power transmitting device with the driving side of the clutch device, and means for drivingly connecting the driven side of the clutch device with the input shaft, and a one-way brake associated with the means drivingly connecting the driven side of the power transmitting device and the driving side of the clutch device adapted to prevent drive of the input shaft in a direction opposite to that of the engine-driven shaft when the sides of said clutch device are engaged.

6. In combination, a transmission input shaft, a clutch having a driven side drivingly connected with the input shaft and a driving side engageable with the driven side, a slip-drive power transmitting drive drivingly connected with the driving side of the clutch, a driving shaft drivingly connected to the slip-drive device, and a one-way brake for preventing rotation of the input shaft in a direction opposite to that of the driving shaft during engagement of the clutch sides, said brake being positioned between the slip-drive device and the clutch.

7. In combination, an input shaft for a transmission, a clutch having a driving side and a driven side drivingly connected to the input shaft, a slip-drive power transmitting unit drivingly connected to the driving side of the clutch and a one-way brake associated with the means drivingly connecting the slip-drive unit to the driving side of the clutch for preventing rotation of the input shaft in one direction during engagement of the clutch, said brake comprising a fixed external member, a movable internal member carried by the means drivingly connecting the slip-drive unit to the driving side of the clutch, and means adapted to be wedgingly engaged by said members.

8. The combination with an engine driven shaft, a hydraulic torque converter comprising impeller, turbine and reaction members operatively associated in a closed hydraulic circuit, a clutch device comprising driving and driven sides engageable for the transmission of torque, means drivingly connecting the engine-driven shaft and the impeller member of the torque converter, means drivingly connecting the turbine member of the converter and the driving side of the clutch device, a one-way brake device positioned between the torque converter and the clutch device and associated with the last mentioned means so as to prevent rotation of the driving side of the clutch in a direction opposite to that of the engine driven shaft and an overrunning clutch device operatively associated with the engine driven shaft and the turbine member of the torque converter so as to prevent the turbine member from overrunning the engine driven shaft in the direction of rotation of the engine driven shaft.

9. In combination an engine driven shaft, a slip-drive power transmitting unit having driving and driven members adapted to transmit torque, a clutch device having driving and driven sides engageable for the transmission of torque, and a transmission input shaft drivingly connected to the driven side of the clutch device, means drivingly connecting the engine driven shaft and the driving member of the power transmitting device and means drivingly connecting the driven member of the power transmitting device and the driving side of the clutch device, a one-way brake device associated with the last mentioned means adapted to prevent rotation of the transmission input shaft in a direction opposite to the direction of rotation of the engine driven shaft when the sides of the clutch device are engaged, and an overrunning clutch device associated with the engine driven shaft and the driven member of the power transmitting unit to provide means for transmitting a positive drive for the transmission input shaft to the engine driven shaft when the sides of the clutch device are engaged.

10. In a slip-drive power transmitting device, a driving member, a driven member, an overrunning clutch device drivingly connected between said members adapted to prevent overrunning of said driven member with respect to said driving member in the normal direction of rotation of said driving member, and a one-way brake device connected between said driven member and a relatively fixed member adapted to prevent rotation of said driven member in a direction opposite to the normal direction of rotation of the driving member.

11. In combination a drive transmitting train including a driving shaft, a fluid power transmitting device and a clutch device, said power transmitting and clutch device each including driving and driven members, means drivingly connecting the driving shaft and the driving member of the power transmitting device, means drivingly connected between the driven member of the power transmitting device and the driving member of the clutch device, a one-way brake device associated with said last mentioned means adapted to prevent rotation of the driving member of said clutch device in a direction opposite to that of the driving shaft and an overrunning clutch connected between the driving shaft and the driven member of the power transmitting device adapted to prevent the driving member of said clutch device from overrunning said driving shaft in the direction of rotation of said driving shaft.

12. The combination with an engine-driven shaft, a slip-drive power transmitting device, a clutch having a driving side and a driven side, means for drivingly connecting the engine driven shaft with the power transmitting device, and means for drivingly connecting the power transmitting device with the driving side of the clutch; of a one-way brake associated with the driving side of the clutch adapted to prevent drive of the driving side of the clutch in a direction opposite to the normal direction of drive of the engine driven shaft, and an overrunning clutch operatively connected between the engine driven shaft and the means drivingly connecting the power transmitting device with the driving side of the clutch adapted to prevent overrunning of the driving side of the clutch with respect to the engine driving shaft in the normal direction of drive of the engine driven shaft.

13. The combination with an engine-driven shaft, and a transmission input shaft, of a slip-drive power transmitting device and a clutch device operatively connected between said shafts, said power transmitting device and said clutch device each having a driving member and a driven member, means for drivingly connecting the engine-driven shaft to the driving member of the slip-drive power transmitting device, means for drivingly connecting the driven member of the slip-drive power transmitting device to the driving side of the clutch device, and means for drivingly connecting the driven side of the clutch device to the input shaft, a one-way brake associated with the means drivingly connecting the driven member of the slip-drive power transmitting device to the driving side of the clutch device adapted to prevent drive of the input shaft in a direction opposite to that of the engine-driven shaft when the driving and driven members of said clutch device are engaged, and an overrunning clutch connected between the engine driven shaft and the driven member of the slip-drive power transmitting device adapted to prevent overrunning of the driving side of the clutch device with respect to the engine driven shaft.

14. In combination with an input shaft, an intermediate driven shaft and an output shaft, a slip-drive power transmitting device drivingly connected between the input shaft and the intermediate driven shaft and an engageable clutch device having driving and driven members arranged between and adapted to be engaged to drivingly connect the intermediate driven shaft and the output shaft, a one-way brake device operatively associated with the driving member of the clutch device and adapted to prevent rotation of the engaged clutch device in a direction opposite to the normal direction of rotation of the input shaft.

15. In combination with an input shaft, an intermediate driven shaft and an output shaft, a slip-drive power transmitting device comprising driving and driven elements drivingly connected between the input shaft and the intermediate driven shaft and an engageable clutch device having driving and driven members arranged between and adapted to be engaged to drivingly connect the intermediate driven shaft and the output shaft, a one-way brake device operatively associated with the driving member of the clutch device and adapted to prevent rotation of the engaged clutch device in a direction opposite to the normal direction of rotation of the input shaft, and an overrunning clutch operatively connected between the input shaft and the driven element of the slip-drive power transmitting device adapted to prevent overrunning of the intermediate driven shaft with respect to the input shaft in the normal direction of rotation of the input shaft.

WILLIAM T. DUNN.

REFERENCES CITED

The following references are of record in the file of this patent:

UNITED STATES PATENTS

| Number | Name | Date |
|---|---|---|
| 2,049,798 | Booth et al. | Aug. 4, 1936 |
| 2,343,304 | La Brie | Mar. 7, 1944 |